May 26, 1953     M. F. HUEBSCH ET AL     2,639,516
DRY CLEANING APPARATUS

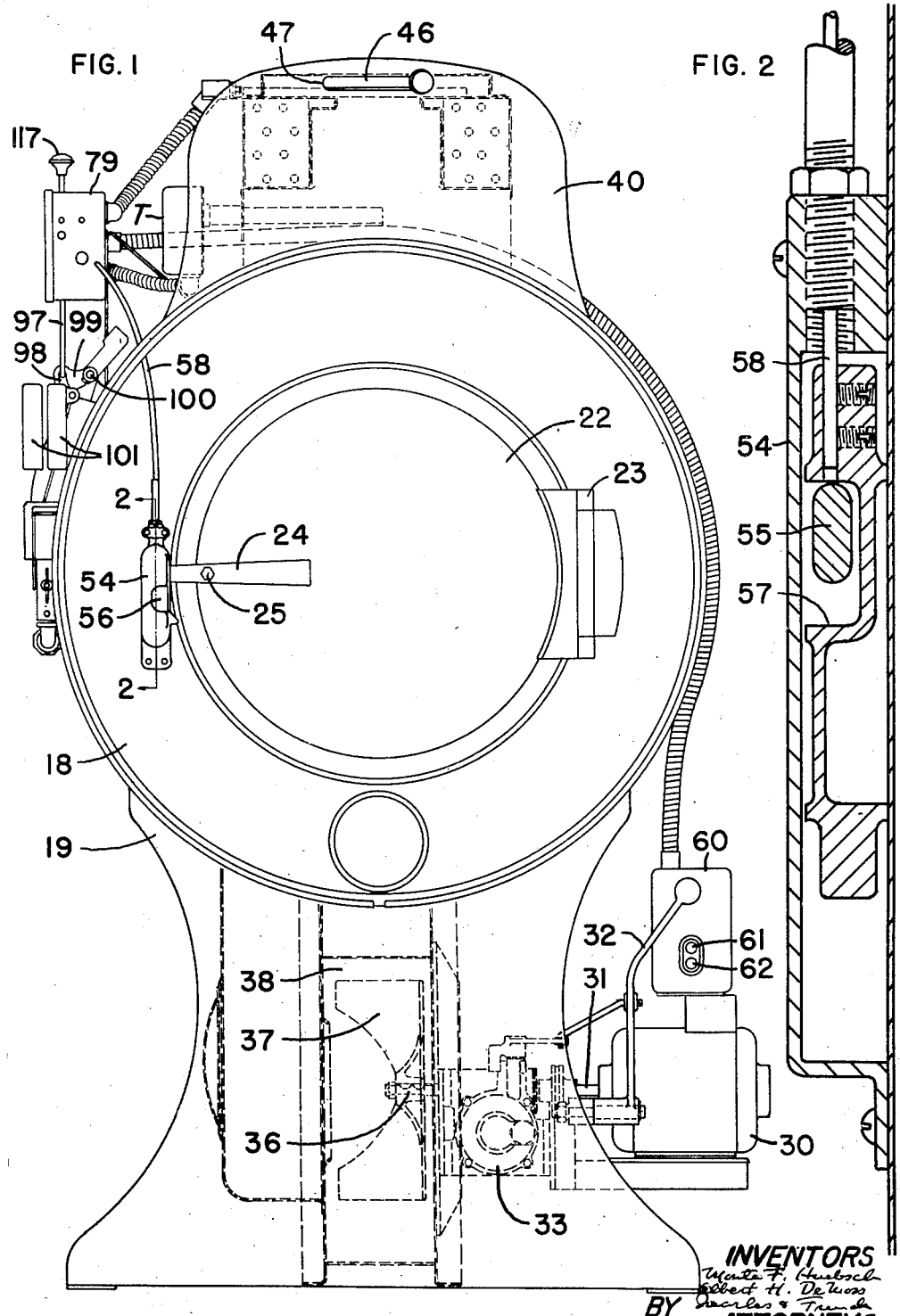

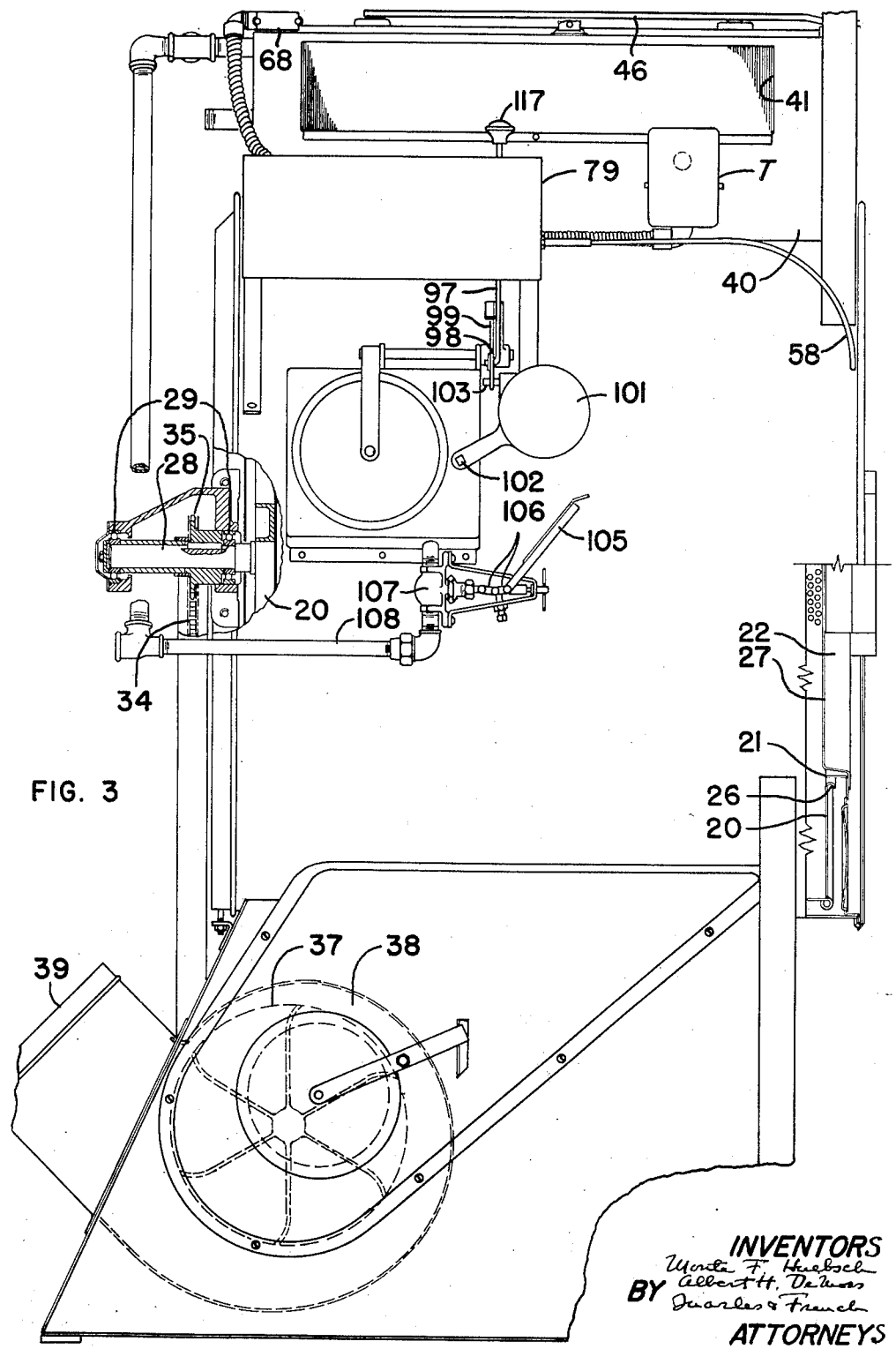

Filed Feb. 4, 1949     10 Sheets-Sheet 3

INVENTORS
Monte F. Huebsch
BY Albert H. DeLuiss
Quarles & French
ATTORNEYS

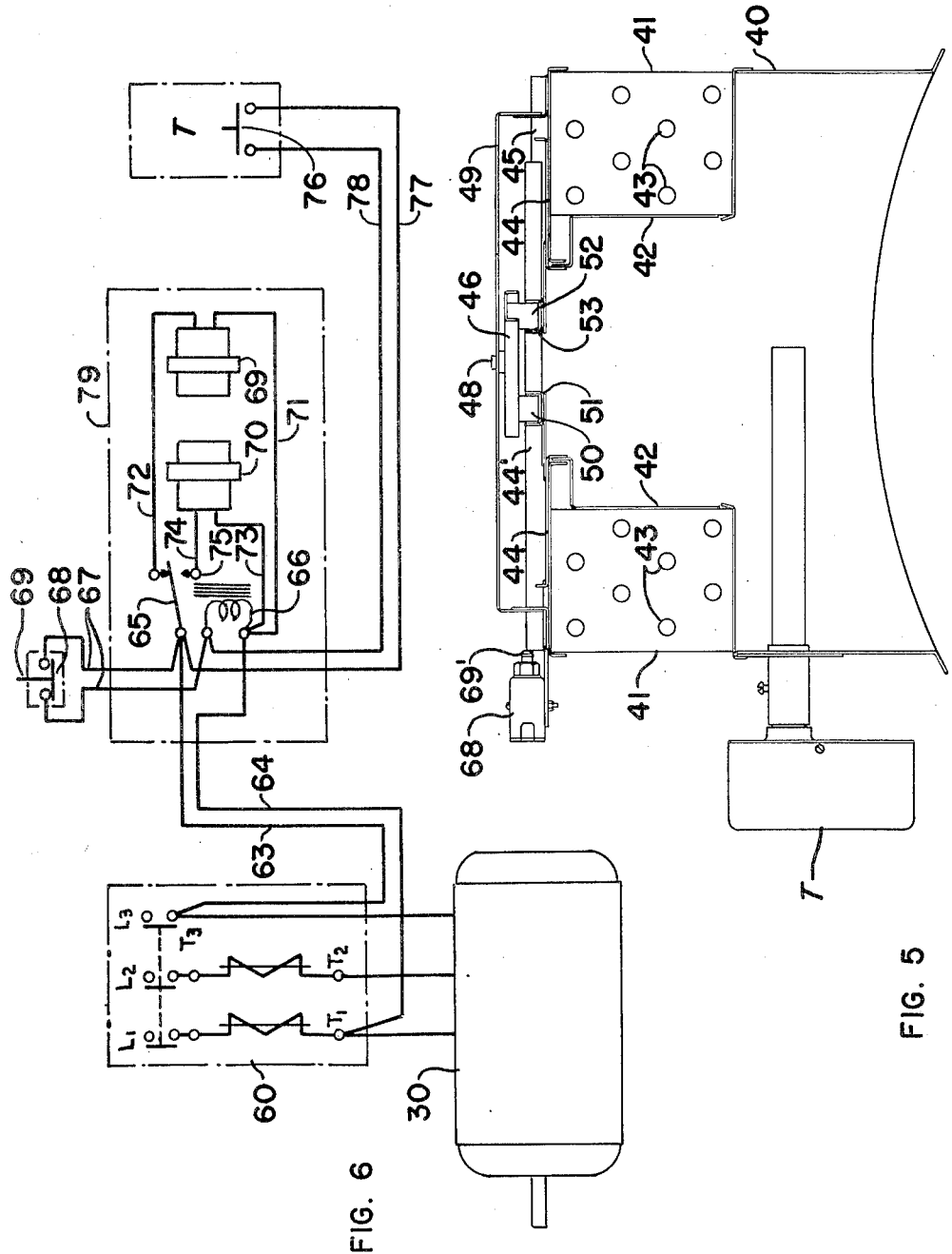

May 26, 1953

M. F. HUEBSCH ET AL 2,639,516

DRY CLEANING APPARATUS

Filed Feb. 4, 1949

INVENTORS
Monte F. Huebsch
Albert H. DeLuxo
BY Quarles & French
ATTORNEYS

INVENTORS
Monte F. Huebsch
Albert H. DeMoss
BY Quarles & French
ATTORNEYS

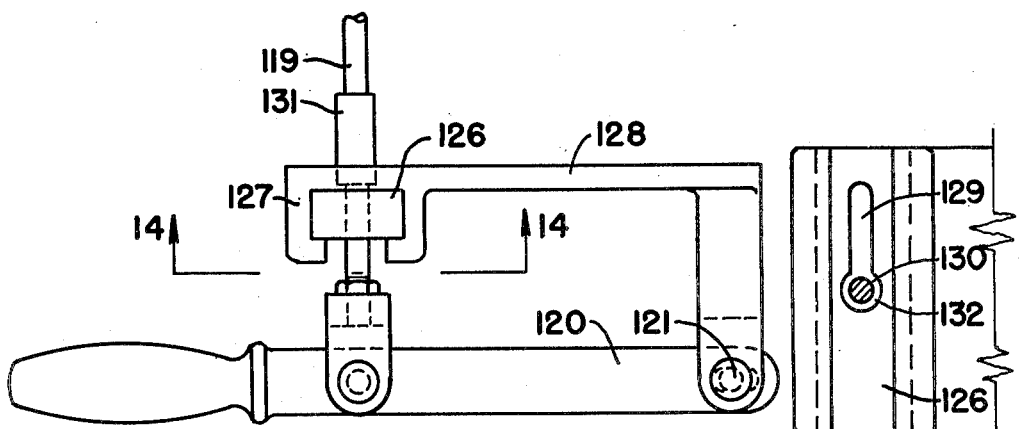
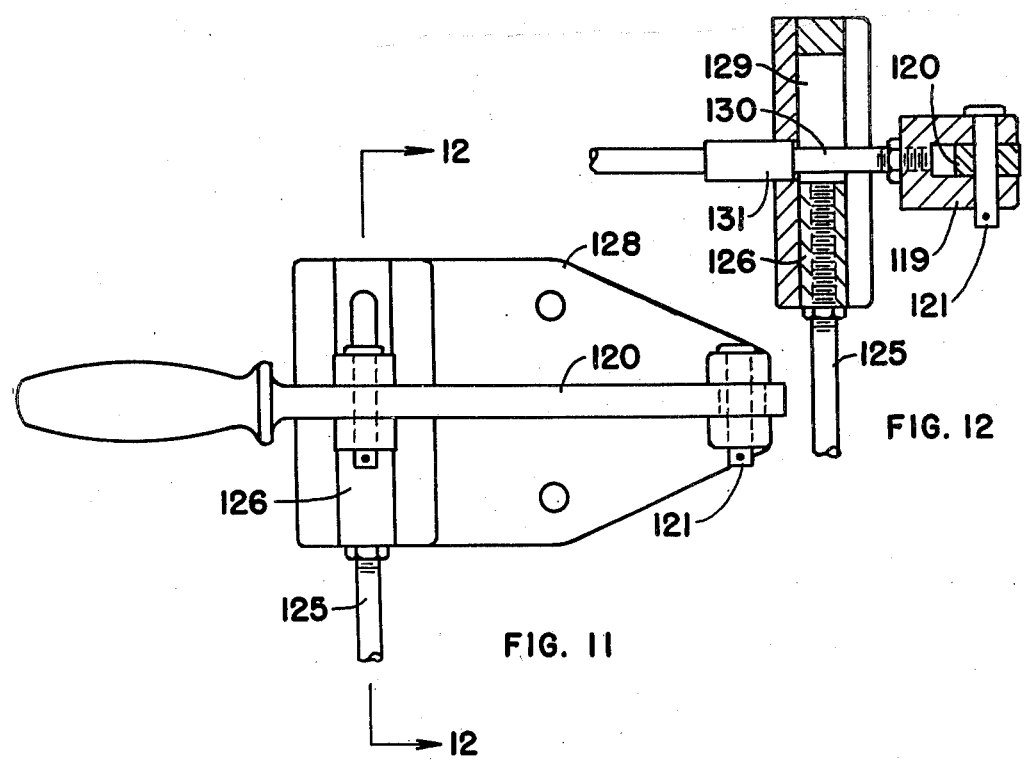

INVENTORS
Monte F. Huebsch
Albert H. Dehors
BY Quarles & French
ATTORNEYS

Patented May 26, 1953

2,639,516

UNITED STATES PATENT OFFICE 2,639,516

DRY CLEANING APPARATUS

Monte F. Huebsch and Albert H. De Moss, Fox Point, Wis., assignors, by mesne assignments, to The American Laundry Machinery Company, Cincinnati, Ohio, a corporation of Ohio Application February 4, 1949, Serial No. 74,576

6 Claims. (Cl. 34—45)

The invention relates to dry cleaning apparatus and more particularly to apparatus for drying materials which have previously been treated with an inflammable cleaning solvent.

The main object of the invention is to provide controls for the apparatus which makes it impossible to open the door of the drying tumbler when heat is being introduced therein to safeguard the operator against injury from any possible explosions of the inflammable cleaning solvent as a result of its being heated. Heretofore drying tumblers have had thermostatic controls associated with the tumbler door lock to prevent opening of the door, but such controls do not satisfy absolute safety requirements because a certain time interval always elapses before the thermostat is effective, and during this time interval accidents may occur. According to the present invention, the opening of the tumbler door is prevented as soon as heated air is admitted to the drum and before the thermostatic control can be effective to prevent opening of the door.

The invention further consists in the several features hereinafter described and more particularly defined by claims at the conclusion hereof.

In the drawings:

Fig. 1 is a front elevation view of a drying apparatus embodying the invention;

Fig. 2 is an enlarged detailed sectional view taken on the line 2—2 of Fig. 1;

Fig. 3 is a side elevation view of the drying apparatus, parts being broken away and parts being shown in section;

Fig. 5 is a detailed vertical sectional view taken on the line 5—5 of Fig. 4;

Fig. 6 is a circuit wiring diagram;

Fig. 11 is a detailed front elevation view of control means shown in Fig. 9;

Fig. 12 is a detailed vertical sectional view taken on the line 12—12 of Fig. 11;

Fig. 13 is a top elevation view of the control means shown in Fig. 11;

Fig. 14 is a detailed vertical sectional view taken on the line 14—14 of Fig. 13;

Figure 4:
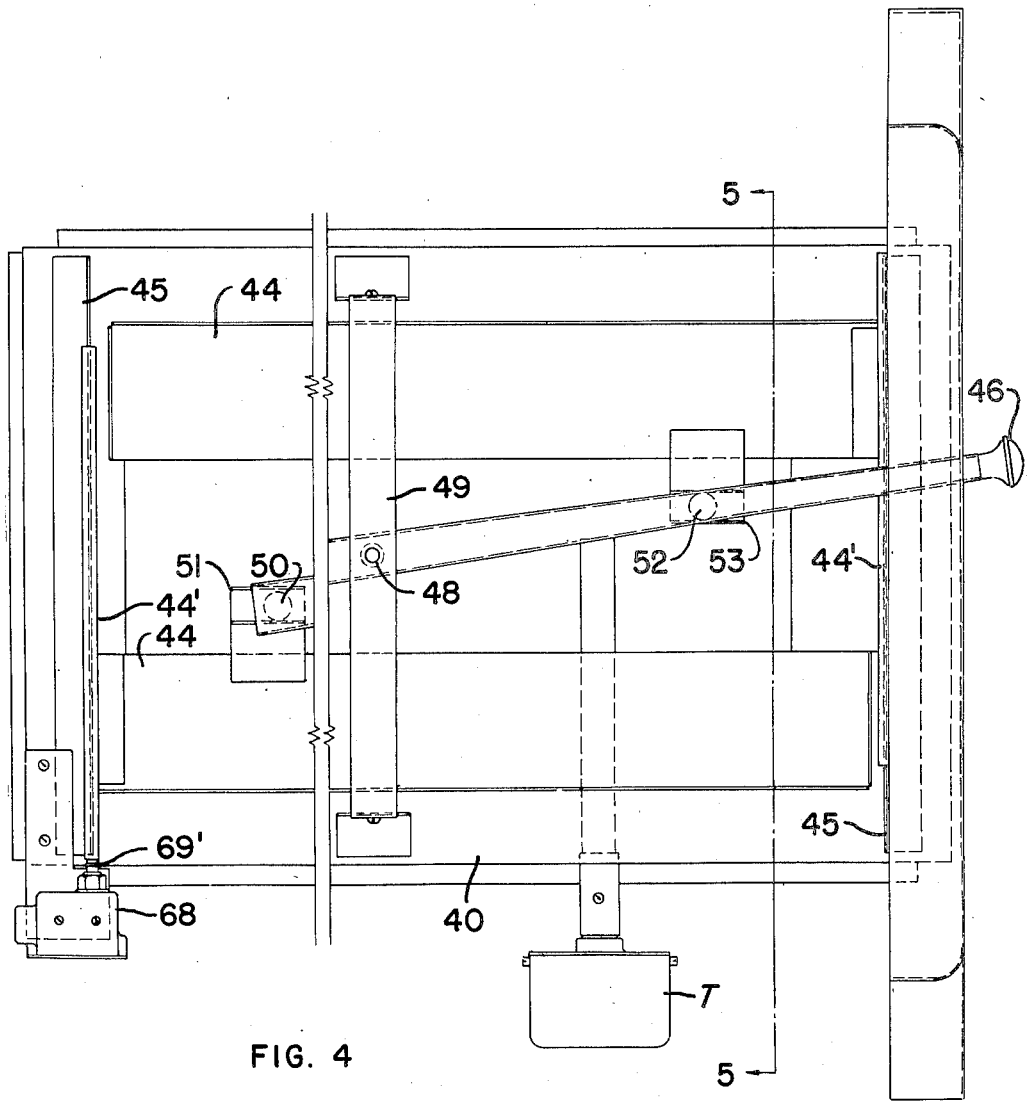
Fig. 4 is a top plan view of the apparatus.

Referring to Figs. 1 to 8, the drying apparatus includes a housing 18 mounted on a base 19 and within which the usual perforated drying drum or tumbler 20 is mounted, said housing having a cylindrical opening 21 at one end closed by a door 22 hinged to said housing at 23 and carrying a locking handle 24 pivoted on the door at 25. The front end of the tumbler 20 has an access opening 26 into which a portion 27 of the door projects when in closed position. The back end of the tumbler 20 is provided with a shaft projection 28 mounted in bearings 29 in the housing and by which said tumbler is supported for rotation in the housing. An electric motor 30 has its drive shaft 31 connected by suitable clutch mechanism including a clutch shifting lever 32 with reduction gearing in a housing 33, the output shaft of which (not shown) carries a sprocket (not shown) connected by a chain 34 with a sprocket 35 keyed to the shaft 28 whereby the tumbler is continuously driven while the motor 30 is operating and the clutch is engaged. The shaft 31 also has a direct connection with a shaft 36 carrying a suction fan 37 mounted in a fan housing 38 in the base 19 and provided with an outlet 39 and with an inlet communicating with the housing, the fan being continuously driven by the motor 30.

Referring to Figs. 1 to 5, the housing 18 has a hood or extension 40 which has side air inlet openings 41 controlled by shutters 42, each of said inlet openings having a plurality of steam heated coils 43 therein over which the air passes as it is drawn into the housing 18 by the suction action of the fan 37, the air passing through the housing and through the apertured tumbler 20 where it comes in contact with the material to be dried and being expelled through the outlet 39. The coils 43 are supplied with steam from a suitable source of supply under the control of a suitable shut off valve but heated air is not supplied to the drum unless the shutters 42 are in an open position.

Each shutter 42 depends from a base plate 44 that is slidably mounted in the hood 40 and has a part 44′ slidably guided on horizontally disposed guide rails 45 in said hood. A manually operated lever 46 projects through a slot 47 in the hood and is pivotally connected intermediate its ends at 48 to a fixed support 49. Beyond the fulcrum 48 the lever carries a pin 50 working in a channeled bracket 51 fixed to one of the shutters 42 and in front of the fulcrum said lever carries a pin 52 working in a channeled bracket 53 fixed to the other shutter so that shifting said lever toward the left as viewed in Fig. 1 causes the shutters 42 to move inwardly toward each other to allow passage of air through the openings 41 past the coils 43.

Referring to Figs. 1 and 2, the door locking handle or latch 24 is adapted to be engaged with a keeper 54 by swinging said handle upwardly to a position where its outer end 55 will pass through a slot 56 in said keeper and then swinging said handle downwardly the end 55 moves upwardly through a vertical slot in said keeper to the locked position shown in Fig. 1. With the door in a locked position the latch 24 may be locked against movement to door opening position by a retainer member 57 moved by said latch and slidably mounted in the keeper and adapted to engage the latch in its locked position to prevent its movement. The retainer member 57 is held in its locking and release positions by a flexing wire cable 58 connecting it with a control lever 59, see Fig. 7.

Referring to Fig. 1, the motor 30 is supplied with operating current through a starting switch 60 provided with the usual start and stop buttons 61 and 62 and is shown in Fig. 6 connected with a three phase current supply from which conductors 63 and 64 lead, the door lock control mechanism including a relay operated pivoted switch member 65, one terminal of which is connected to the conductor 63. The other conductor 64 connects with one side of the relay coil 66. The circuit through the coil 66 is completed by a conductor 67 connecting the other side of coil 66 with the conductor 63, said conductor 67 having a switch 68 therein whose operating member 69′ is engageable with a projection on the part 44′ of one of the shutters 42 when the shutters are closed so that opening of the shutters 42 permits the switch 68 to close.

The control mechanism includes what we term a cold solenoid 69 and a hot solenoid 70. The coil of the cold solenoid is energized by passage of current from conductor 64 through conductor 71 to its coil and then through conductor 72 and switch 65 in the position shown in Fig. 6 to the conductor 63. The coil of the hot solenoid is energized by passage of current from the conductor 64 through conductor 73 to its coil and then through conductor 74 and switch 65, which is contacting with contact 75 by the closing of the switch 68. A thermostatically operated switch 76 has a conductor 77 connected with conductor 63 and a conductor 78 connected with the coil 66 so that closing of this switch 76 also completes a circuit through the coil 66 to hold the switch 65 in hot solenoid energizing position.

Figure 7:
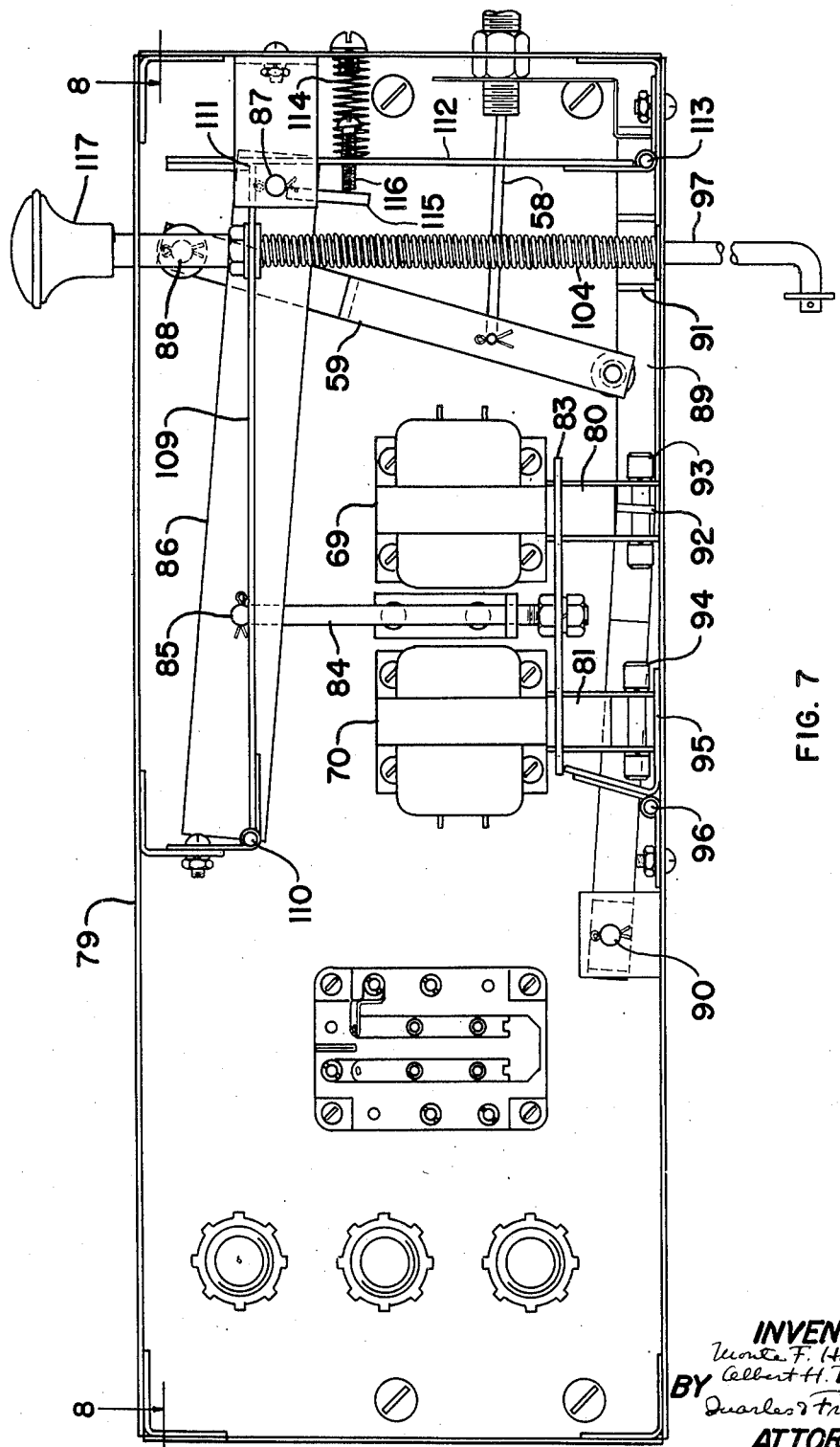
Fig. 7 is a detailed vertical sectional view through a box containing part of the control mechanism.

Referring to Fig. 7, the solenoids 69 and 70 are mounted in a box 79 and have plungers 80 and 81 which pass through apertures 82 in a plate 83 which is carried by a vertically movable rod 84 operatively connected at its upper end 85 with a weighted lever 86 pivoted at 87. The plate 83 may be lifted by either of the plungers 80 or 81. The lever 59 is pivotally mounted on the box at 88 and is prevented from being moved by the cable 58, to permit unlocking of the door latch, by a blocking lever 89 pivotally mounted in the box at 90 and provided with a projection 91 disposed in the path of movement of the roller carrying end of said lever 59 to its door unlocking position. Lever 89 also has a projection 92 which is operatively connected with the headed bolt 93 at the lower end of the plunger 80, so that when the cold solenoid 69 is energized to raise its plunger 80, it will also raise the lever 89 to a position where it will not interfere with the swinging of the lever 59 and the movement of the cable 58 and the retainer 57 to a position in which the door latch 24 may be released from its keeper. The only time, however, the cold solenoid is energized is when switch 68 is opened, the shutters 42 are closed and the thermostatic switch 76 is open. The plunger 81 of the hot solenoid 70 also carries a headed bolt 94 at its lower end. The bolts 93 and 94 on the raising of their plungers are adapted to engage and raise the plate 83 to its upper position shown in Fig. 7. The movement of either plunger raises the plate 83. When the plunger 80 of the cold solenoid raises the plate 83, it is held in its raised position by a gravity actuated strut or latch 95 hinged or pivoted at 96 so that deenergization of the cold solenoid will not cause said plate to fall. But when the hot solenoid is energized, the head of bolt 94 engages the raised plate, one of the ends of this bolt 94 engages the upper end of the latch 95 and swings it out and holds it out of engagement with the plate 83 so that when the hot solenoid is on the plate is free to fall. Until the plunger 81 is raised, it engages a part of the latch 95 so that its weight acts to hold said latch upright but permits the cold solenoid raising said plate until said latch 95 may engage beneath it as shown in Fig. 7. In the normal cycle of operations due to the overlap of the relay contacts, the plunger 80 of the cold solenoid will pull up before the plunger 81 of the hot solenoid drops, thus supporting the plate 83 and permitting the latch 95 to engage said plate.

The weighted lever 86 is used to operate a trip mechanism that acts on a rod 97 which is connected to the slotted end 98 of a lever 99 (see Figs. 1 and 3) pivoted at 100 on the frame of the machine. A weighted lever 101 pivoted at 102 has a projection 103 that normally hooks into slotted end 98 of the lever 99 to hold the weighted lever 101 in the elevated position shown in Fig. 3. A spring 104 acts to move the rod 97 and the parts connected therewith upwardly so that when the trip mechanism is released, the upward movement of rod 97 swings lever 99 upwardly and thereby releases lever 101 from it which then drops striking a trip lever 105 which is operatively connected to a toggle lever connection 106 with the stem of a steam flooding valve 107 which controls the flow of steam through a pipe 108 to the interior of the housing 18 in which the tumbler 20 is disposed. Downward movement of the trip lever 105 unlocks or breaks the toggle levers 106 and opens the stem valve 107 to flood the tumbler with steam. This action occurs whenever the plate 83 drops down to release the trip mechanism which mechanism (see Fig. 7) comprises a lever 109 pivoted at 110 and carrying the rod 97 and normally urged by the spring 104 against a shoulder or latch 111 on a lever 112 pivoted at 113, said lever 112 being normally urged to latching position by a spring 114 interposed between said lever and a side of the box 79. The weighted lever or tripping member 86 has an arm or projection 115, which when said lever swings down as the plate 83 drops, engages a pin 116 on the lever 112 acting against the spring 114 to release the latch 111 from the lever 109 and permit the spring 104 to swing lever 109 upwardly and move the rod 97 upwardly to release the weighted lever 101 to operate the steam valve as above described. The rod 97 carries a knob 117' whereby the operator may push down on the rod 97 to reset the trip mechanism above described.

With the above construction to start the drying, the motor switch 60 is operated to start the motor 30, thus putting the fan 37 in operation and energizing the cold solenoid 69 which raises the lever 89 out of its blocking position relative to the lever 59, the plate 83 being then in its raised position held by bolt head 93, with member 95 in position under it. The handle 24 on the door 22 may now be turned to release it from its keeper 54, and in doing this the retainer 57 engaged by the end 55 of said handle 24 is free to move with it, thus pulling on the cable 58 and swinging the lever 59 to the right from the position shown in Fig. 7. The door 22 may be swung to open position and the tumbler 20 loaded and the door again locked shut. In swinging the latch 24 back to a locked position the retainer 57 is moved upwardly by the latch, thereby moving the cable 58 to swing the control lever 59 back to the position shown in Fig. 7. Rotation of the loaded tumbler 20 may then be started by shifting the clutch lever 32. Thereafter, the lever 46 is moved toward the left as viewed in Fig. 1, thus opening the shutters 42. With the shutters open the projection on the part 44' of one of the shutters is free of switch operating member 69' and switch 68 closes, thereby energizing coil 66 of the relay operated switch and shifting switch member 65 from conductor 72 to contact 75, thereby energizing the hot solenoid 70, the energization of these solenoids overlapping so that the plate 83 will remain in raised position until the plunger 81 releases latch 95 and takes on the duty of holding plate 83 raised. However, as soon as solenoid 69 is deenergized, plunger 80 drops carrying lever 89 down to a blocking position so that lever 59 cannot swing to a position that will permit movement of the latch 24 to open the door. Thus while the hot solenoid is on the door 22 cannot be opened. The door being closed, the drum or tumbler 20 revolving and the shutters 42 being opened, the heated drying air drawn into the drum by the fan 37 past the coils 43 contacts the material and vaporizes the inflammable cleaning fluid which is thus carried off through the exhaust 39. As soon as the temperature of the air is sufficient to operate the thermostat T projecting into the hood 40, its switch 76 closes and remains closed until the temperature in the housing again drops to a point at which switch 76 will open. While closed, switch 76 takes over the duty of switch 68 to complete the circuit holding switch member 65 in a hot solenoid energizing position, and since plunger 80 and lever 89 are down, lever 59 is blocked from movement so that door latch 24 cannot be operated to open the door 22.

If under operating conditions supply of current to the motor should fail, the hot solenoid will be deenergized and plate 83 will then drop operating the trip mechanism and its associated mechanisms above described to open the steam flooding valve 107. on a resetting of the trip lever 101, the steam valve 107 may be closed by moving the lever 105 upwardly to the position shown in Fig. 3 to break the toggle joint of the toggle levers 106. Current failure also prevents unlocking of the door 22 since lever 89 is then down in its blocking position preventing lock release movement of lever 59.

Toward the end of the drying operation the shutters or dampers 42 are again moved back to closed position, thus permitting switch 68 to open, but until switch 76 is released, switch 68 and its circuit is not effective so that the cold solenoid 69 is not energized to raise lever 89 to a non-blocking position until the temperature has dropped sufficiently to cause switch 76 to open and thus permit the shifting of the switch member 65 from hot solenoid energizing position to cold solenoid energizing position. When this occurs and lever 89 is raised by the plunger 80, the lever 59 can then be moved toward the right as viewed in Fig. 7 to permit unlatching of the door 22. With the switch member 65 in cold solenoid energizing position, the plate 83 as previously noted is prevented from dropping so that when current is cut off either by closing of the shutters 44 and operation of switch 68 or by the opening of the motor circuit, the trips controlling the steam valve 107 will not be operated.

Figure 8:
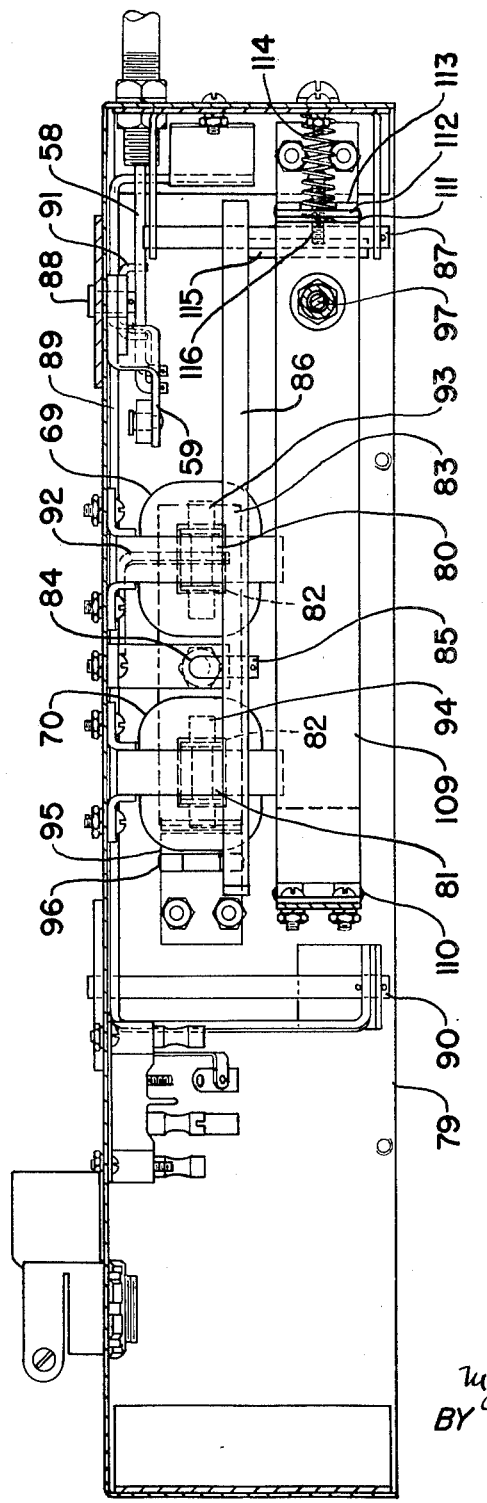
Fig. 8 is a detailed horizontal sectional view taken on the line 8—8 of Fig. 7.
Figure 9:
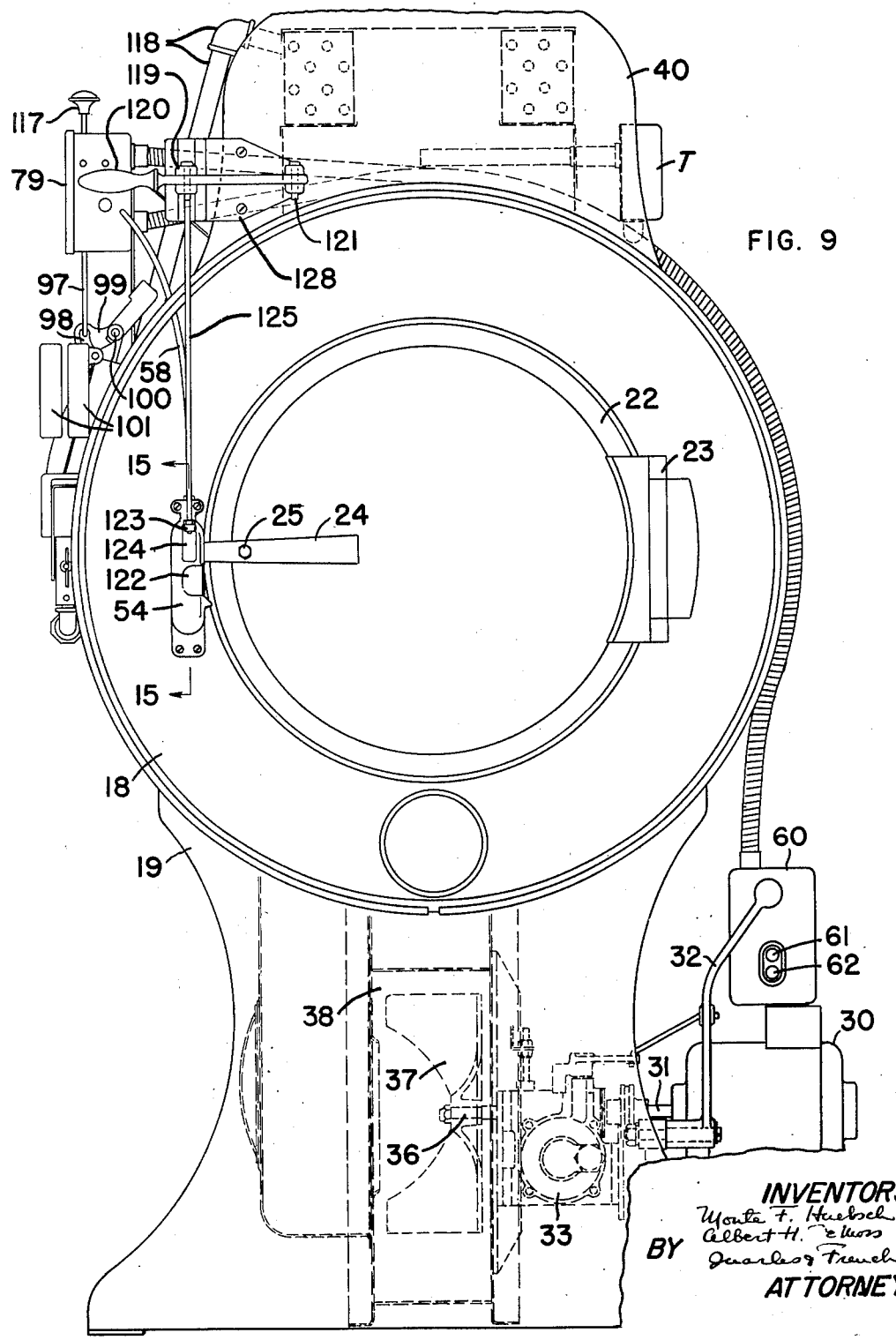
Fig. 9 is a view similar to Fig. 1 showing certain modifications.
Figure 10:
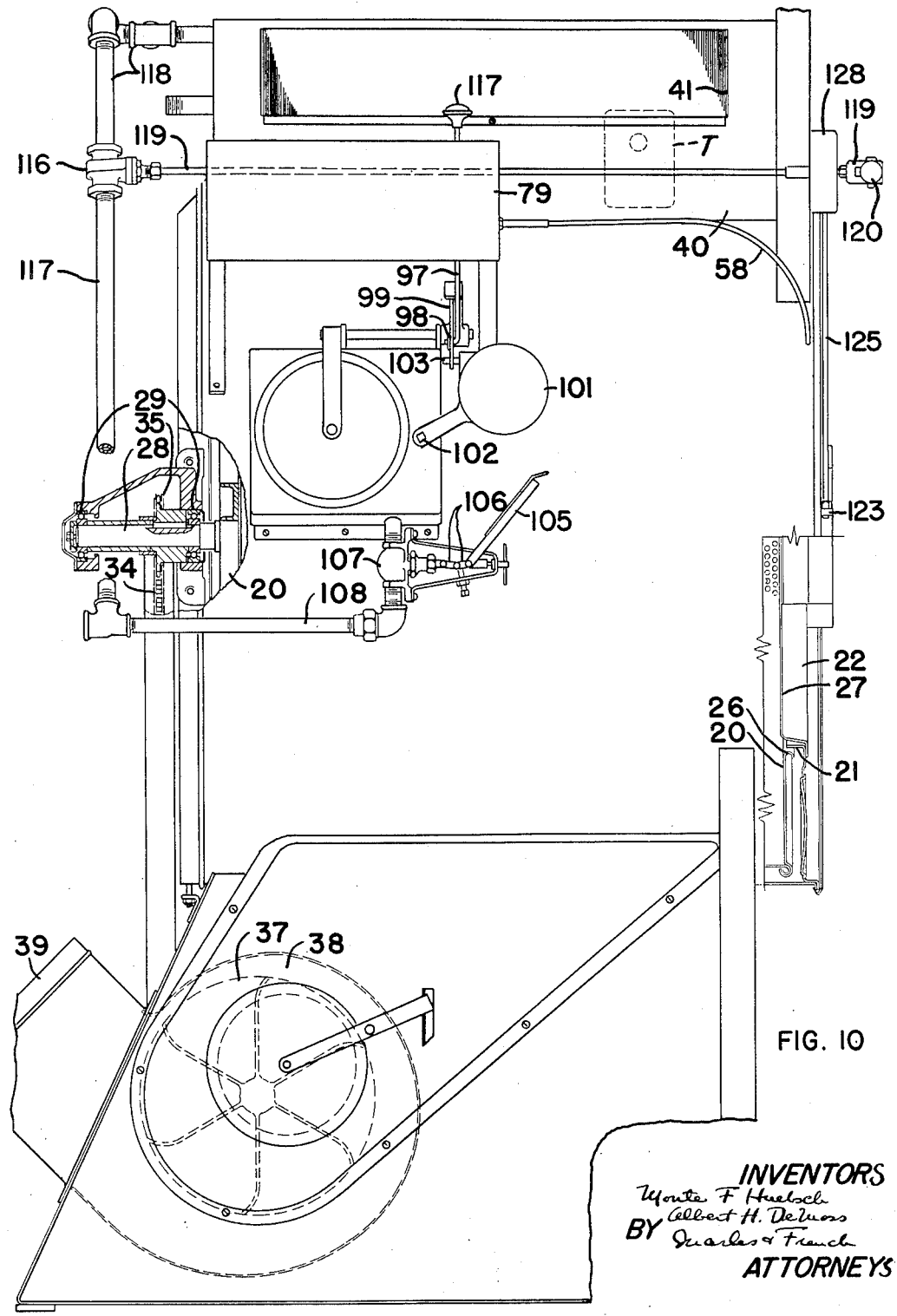
Fig. 10 is a side elevation view of the device shown in Fig. 9, parts being broken away and parts being shown in section.

Referring to Figs. 9 to 16, the only difference between this construction and the first described construction is that the dampers 42 have been omitted and in place of the damper controlled switch 68 an interlocking arrangement between the door 22 and a manually operable steam valve 116 has been provided. Similar parts have been given similar numerals, and Figs. 7 and 8 are to be considered as a part of this modified form.

Referring to Figs. 9 to 15, the steam valve 116' controls flow of steam through a pipe 117 to piping 118 connected with the coils 43, said valve having its stem connected to a horizontally disposed rod 119 which is connected to a manually operated lever 120 pivoted at 121. A door latch retainer member 122 is the same as retainer 57 except that it has a projection 123 slidably extending through a slot 124 in the keeper 54 and connected to a vertically movable rod 125 which as shown in Figs. 11 to 14 connects with a locking block 126 slidably mounted in guides 127 in the support 128 for the lever 120. The block 126 has a key hole slot 129 formed therein, and the valve rod 119 extends through said slot 129 and is of two diameters, the small diameter 130 permitting sliding movement of said block 126 the length of the slot 129, and the large diameter 131 permitting sliding movement of said rod only through the larger portion 132 of the slot 129.

Figure 16:
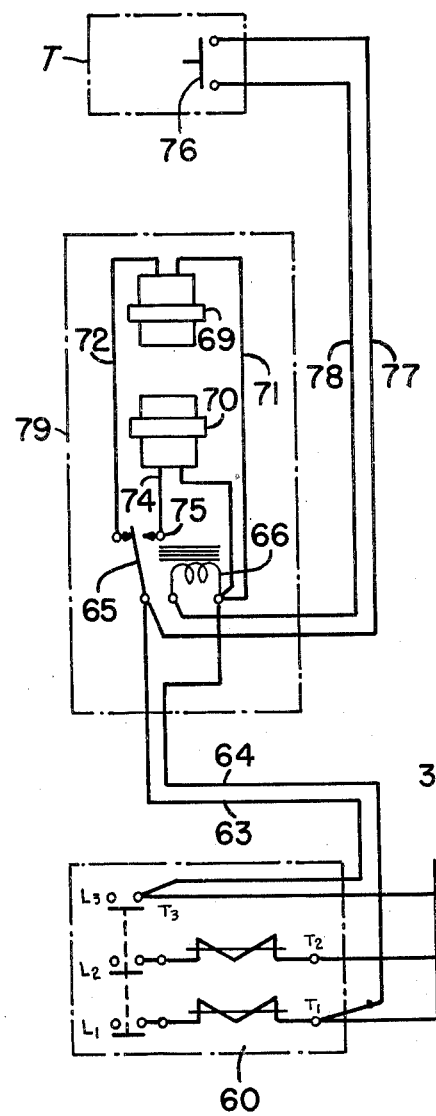
Fig. 16 is a circuit wiring diagram.
Figure 15:
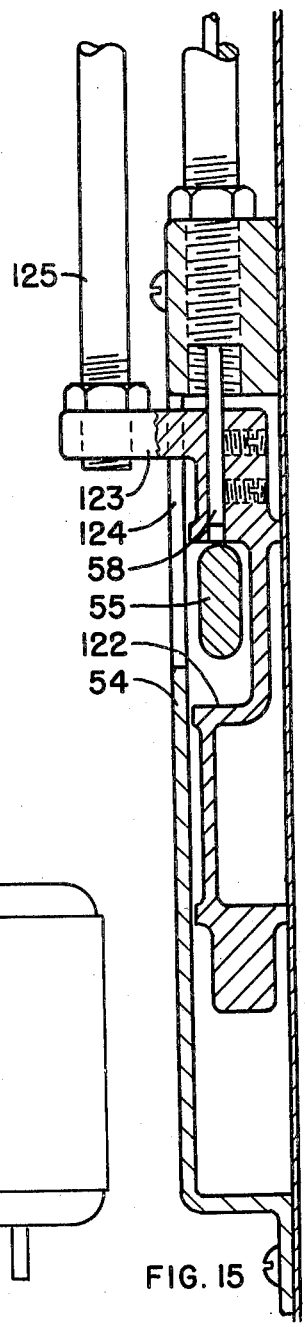
Fig. 15 is a detailed vertical sectional view taken on the line 15—15 of Fig. 9.

Referring to Fig. 16, the circuits therein shown are identical with those of Fig. 6 except that switch 68 and its conductors have been omitted. The only other difference in construction is that the thermostat T has been moved to the opposite side of the hood 40 to accommodate the steam valve.

The modified construction is operated, as follows: Throwing in the motor switch 60 starts the motor 30 and allows current passage through conductors 63 and 64, switch 65 and conductors 71 and 72 and solenoid 69 which as in the first construction lifts plate 83 to its raised position and also moves lever 89 to an unblocking position. The operator may then unlatch the door 22 by swinging the handle 24 upwardly until its end 55 is in line with the slot 56 in the keeper 54 so that the door can be opened. The machine is then loaded but with the door open steam cannot be admitted into the coils 43 because in movement of the latch 24 to unlocked position its end 55 engages retainer 122 moving it downwardly and with it the rod 125 and block 126 presenting a narrow portion of slot 129 in the path of the rod 130 to bar or prevent movement of valve rod 119 to open the steam valve 116'. Upon movement of the latch 24 back to its latched position the retainer 122, rod 125 and block 126 are moved upwardly bringing the block 126 to a position in which the large opening 130 of slot 129 alines with part 131 of rod 119 so that said rod is now free to be moved to open the steam valve 116' by the outward pull of the lever 120. With the steam valve stem 131 in open valve position the retainer 122 cannot be moved, and consequently the latch 24 cannot be moved to an unlocked position. Thus as in the first described construction, the door cannot be unlocked as soon as heated air is furnished to the drum. After the interval necessary to render the thermostat T operative to close its switch 76, the control current then acts as before to complete the circuit to the relay including coil 66 which then moves switch 65 into contact with contact 75 establishing current flow through the hot solenoid which functions as in the first construction to hold the plate 83 in an elevated position except that if current fails the plate 83 will drop and as previously described operate the steam flooding valve 107. As soon as the cold solenoid is deenergized, the plunger 80 falls carrying the lever 89 to a blocking position relative to the lever 59, so that while the hot solenoid is on, the door latch 24 cannot be operated. Any other operations not specifically mentioned in connection with the modified form are the same as those described in connection with the first form.

From the above it will be noted that in each instance means have been provided for preventing opening of the door 22 as soon as heated air is available to the chamber containing the tumbler loaded with the material from which the inflammable cleaning fluid is to be removed by drying so that the door cannot be opened during the time interval that ordinarily elapses in order for the automatic thermostatic control to become effective to prevent opening of the door, thus safeguarding the operator against injury from possible explosions that might occur when the heat was on and the door was in an open position.

We desire it to be understood that this invention is not to be limited to any particular form or arrangement of parts except in so far as such limitations are included in the claims.

What we claim as our invention is:

1. In a drying apparatus having a housing provided with an access opening, a movable door for said opening, and manually operable latching means for said door, the combination of blocking means for said latching means including a blocking lever, electrically operated means for moving said blocking lever out of blocking position to permit operation of said latching means, means for circulating air through said housing, means for heating said air, operator controlled means for controlling the supply of heated air to said housing and means, operable as an incident to the operation of said control means, for rendering said electrically operated means inoperative to move said blocking lever on the operation of said control means for the supply of heated air to said housing.

2. Apparatus defined in claim 1 in which the admission of heated air to said housing is controlled by a damper and the electrically operated means for moving said blocking lever out of blocking position is energized from an electrical circuit including a switch controlled by said damper.

3. In a drying apparatus of the character described, the combination with a drying chamber having an access opening and a movable door for closing said opening, operator controlled means for locking said door in closed position, means for circulating drying air through said chamber, and means for heating the drying air, of operator controlled means for controlling the supply of heated air to said chamber, and means operable as an incident to the operation of said control means for preventing release of said door locking means as soon as said controlling means is operated to supply heated air to said chamber.

4. In a drying apparatus of the character described, the combination with a drying chamber and means for circulating heated air through said chamber, means for heating the drying air, said chamber having an access opening, a door movable to open and closed position relative to said opening, operator controlled locking means for said door, and thermostatically controlled means for preventing the operation of said locking means when the air in said drum reaches a certain predetermined temperature, of operator controlled means for controlling the supply of heated air to said chamber, and means, operable as an incident to the operation of said control means, for preventing the operation of said locking means by the operator after his operation of said heated air supply controlling means and during the time delay interval for the operation of said thermostat.

5. In a drying apparatus of the character described, the combination with a drying tumbler housing having a door movable to open and closed position, latching means for the door, means for circulating a current of air through the tumbler in said housing and means for heating said air as it passes to said tumbler, of operator controlled means for controlling the supply of heated air to said tumbler, means, operable on the operation of said control means, for preventing unlatching of said door, and means for rendering said last named means ineffective to permit unlatching of said door before said control means is operated.

6. The structure as defined in claim 3 in which the operator controlled means for controlling the supply of heated air to the chamber is a steam valve and its operator controlled actuator and in which the means operable as an incident to the operation of said controlling means for preventing release of the door locking means is a part secured to the door locking means and having an interlocking connection with the steam valve actuator.

MONTE F. HUEBSCH.
ALBERT H. DE MOSS.

References Cited in the file of this patent
UNITED STATES PATENTS

| Number | Name | Date |
|---|---|---|
| Re. 17,336 | McKenna | June 25, 1929 |
| 2,217,153 | Bowdoin et al. | Oct. 8, 1940 |
| 2,360,915 | Vermilya | Oct. 24, 1944 |
| 2,397,091 | Davis | Mar. 26, 1946 |
| 2,470,043 | Monsarrat | May 10, 1949 |